Jan. 7, 1930.  A. E. DRISSNER  1,742,201
SCREW CLAMP
Filed Nov. 26, 1927
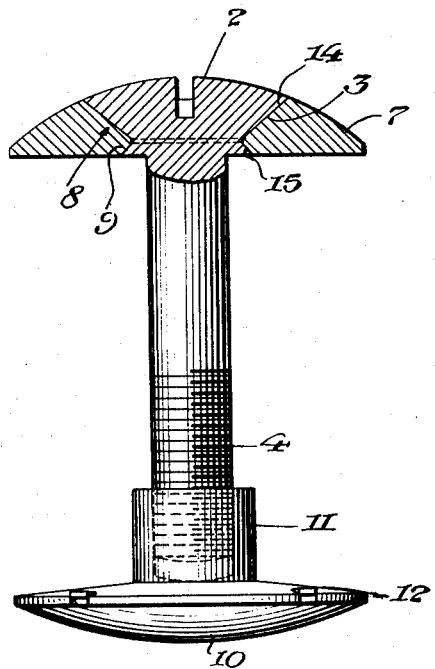
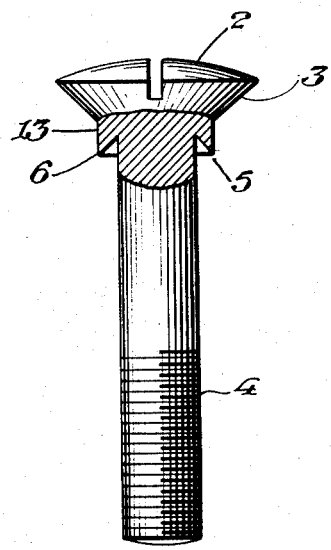
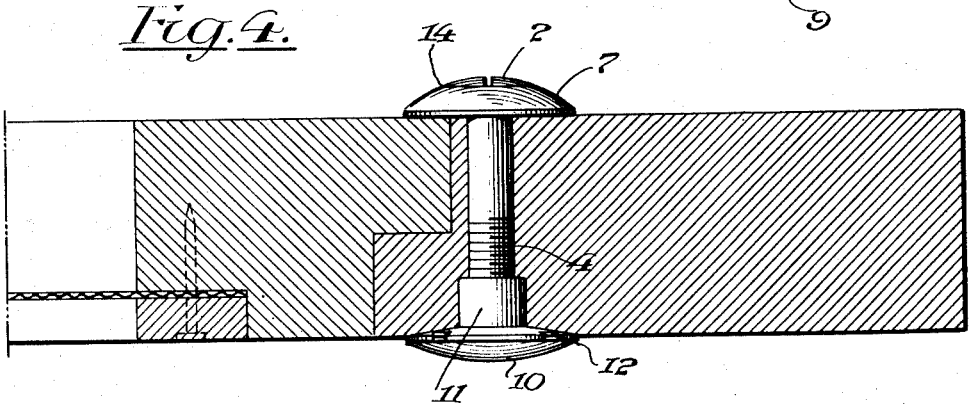
Inventor
Alfred E. Drissner
by his Attorney Patented Jan. 7, 1930

1,742,201

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO

SCREW CLAMP

Application filed November 26, 1927. Serial No. 235,802.

This invention relates to screws and screw clamps and, while useful for various purposes, it is particularly adapted for detachably securing interchangeable screen and glass panels to doors, the object of the invention being to provide a simple, inexpensive, easily manufactured and readily assembled screw or screw clamp, all the parts of which may be automatically made upon a multiple spindle screw machine in an expeditious manner and with a considerable saving of material.

In the drawings accompanying and forming a part of this specification—

Figure 1 is a partly sectional view of this improved screw clamp;

Fig. 2 is a partly sectional view of the screw member thereof;

Fig. 3 is a sectional view of one of the clamping disks, and

Fig. 4 is a partly sectional view of a door illustrating the manner in which this improved screw clamp secures a screen panel thereto.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

This improved screw clamp is made up of three members, comprising a headed screw, a disk and a nut member for attachment to the shank of the screw.

In the present improvement the screw comprises a slotted head 2 having a beveled underside 3 and a threaded shank 4, and the head of the screw at its under side is so formed as to provide an upsettable part 5 which may be in the form of an annular portion or in the form of spaced lugs, as preferred. In the present instance this upsettable portion is shown as an annular projection obtained by recessing or cutting into the under side of the head, thereby forming a V-shaped prong or portion 6. The clamping disk 7 is countersunk, as at 8, for the reception of the beveled under-face 3 of the screw head and is also oppositely countersunk, as at 9, for the reception of the upsettable portion 6 of the screw head which is upset into countersunk portion 9 of the clamping plate 7, thus securing the two members rigidly together and thereby providing an enlarged clamping head to the screw, thus saving a considerable waste of material in forming the screw, since it will be obvious that if the screw and its clamping disk 7 were formed as an integral structure, it would be necessary to utilize a bar having diameter of the disk 7 and turn it down to the desired size of the shank 4—all of which metal, of course, would be wasted, and as these clamping screws are frequently formed of brass, it follows that such a waste would be expensive.

When the screw is intended for use in the manner shown in Fig. 4, the threaded end thereof is provided with a clamping nut 10 having an internally threaded sleeve or nut portion 11 for the reception of the threaded end of the screw, and the nut is also provided with prongs or projections 12 adapted to impinge the wood of the door or frame and prevent the turning of the head 10. In the present instance it will be observed that the clamping disk 7 is inserted onto the shank 4 of the screw having a bore sufficient to receive the enlarged annular portion 13 of the head of the screw, which is undercut in the manner shown at 6 to form the upsettable portion thereof, and that then the portion 6 is upset into the countersunk portion 9 of the clamping disk, thereby firmly securing the two together.

It will be observed by this construction and mode of assemblage of the screw and the clamping disk 7, that the necessity of decreasing the diameter of the shank of the screw is avoided, while a more efficient and rigid hold of the clamping disk and screw is obtained, and that the assemblage of the parts is very much facilitated by reason of the fact that the upsettable portion of the screw is readily accomplished in an expeditious manner, thus avoiding the necessity of in any way mutilating the disk 7.

It will be further observed that in the present improvement the beveled head of the screw snugly fits the counterbored portion 8 of the disk 7, and that when the portion 6 is upset it likewise snugly fits the counterbored portion 9 of the disk, so that the disk is clamped between opposing inclined walls 14 and 15 of the screw head and the turning or displacement of one relatively to the other positively prevented.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A screw comprising a head having a beveled underface and a threaded shank having adjacent to said head an enlarged undercut portion, and a bored disk provided with opposed counterbored portions, one for the reception of the beveled head of the screw, the undercut portion of the screw being upset into the other counterbored portion of the disk, whereby said disk is clamped between a pair of opposed inclined walls of the screw head.

2. A screw comprising a head having a beveled under face and a shank and a bored disk provided with opposed beveled counterbored portions one for the reception of the beveled head of the screw, the opposed beveled portions of the disk forming a V-shaped portion intermediate the top and bottom of said disk, said shank having adjacent to said head a part thereof upset into the other counter-bored portion of the disk whereby the V-shaped portion of the disk is clamped in a laterally-extending V-shaped recess of the head, and whereby the under face of the disk and screw head are flush with each other.

3. A screw comprising a head having a beveled under face and a shank and a bored disk provided with opposed beveled counterbored portions one of greater bevel than the other and the larger for the reception of the beveled head of the screw, the opposed beveled portions of the disk forming a V-shaped portion intermediate the top and bottom of said disk, said shank having adjacent to said head a part thereof upset into the smaller counterbored portion of the disk whereby the V-shaped portion of the disk is clamped in a laterally-extending V-shaped recess of the head and whereby the under-face of the disk and screw head are flush with each other.

4. A screw comprising a head and a bored disk having opposed annular countersunk portions forming oppositely extending inclined walls clamped and rigidly held between annular oppositely extending inclined walls of the head, whereby the under-faces of the disk and screw head are flush, with the inner inclined wall of the head upset over the inner inclined wall of the disk.

Signed at 1822-3-4 Park Row Building, New York city, N. Y., this 24th day of February, 1927.

ALFRED E. DRISSNER.